United States Patent Office 2,730,618
Patented Jan. 10, 1956

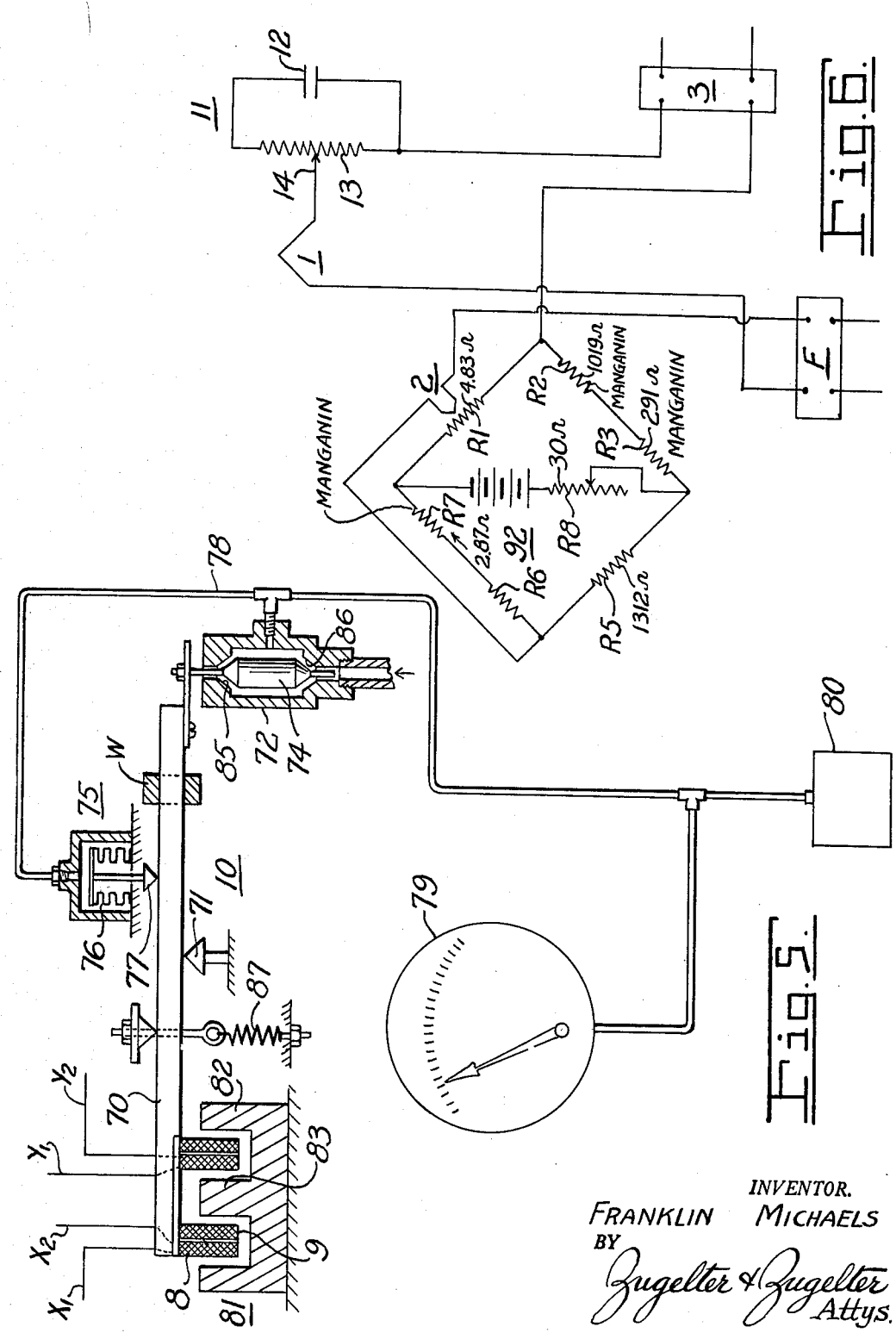

2,730,618

THERMO-COUPLE ELECTRONIC CIRCUITS PROVIDED WITH FEED-BACK TO THE THERMO-COUPLE

Franklin Michaels, Orrville, Ohio, assignor to Hagan Corporation, Pittsburgh, Pa., a corporation of Pennsylvania Application October 25, 1954, Serial No. 464,253

5 Claims. (Cl. 250—27)

This invention relates to thermocouple temperature measuring systems. More particularly the invention relates to systems in which the thermocouple voltage is repeatedly interrupted at a relatively high frequency by a chopper, amplified, demodulated and converted to a direct current output. The systems include means by which output voltage is fed back to the input thermocouple voltage in proportion to a function of the difference between the input and output voltages in order to maintain a substantially constant relationship between the input and the output voltages.

An object of this invention is to provide a thermocouple temperature measuring system in which the thermocouple voltage is converted to an interrupted voltage of a preselected frequency, that voltage being amplified, phase inverted, demodulated and rectified to provide a direct current output, and to provide a means of so using the output voltage as feed back to the thermocouple voltage as to maintain substantial equality between the thermocouple input voltage and the direct current output voltage.

Another object of the invention is to provide a system having means whereby the direct current output voltage may be converted to a pneumatic or other output for use in regulation, recording or both, either at some point near to or remote from the thermocouple and the electronic circuit to which its voltage is supplied.

A further object of the invention is to provide a thermocouple in a system as above set forth, with a potentiometer by means of which the null or set point of the systems may be adjusted to a particular value as required in a particular use application.

A further object is to provide a system as above set forth, that does not require slide wire positioners in the electronic circuit; that has an adjustable suppressed zero; which also shall be operative above and below a set point, and in which the ranges above and below the set point may be made equal or unequal as required.

The above and other objects of the invention will be apparent to those of ordinary skill in the art to which the invention pertains from the following description and drawings.

Figure 1:
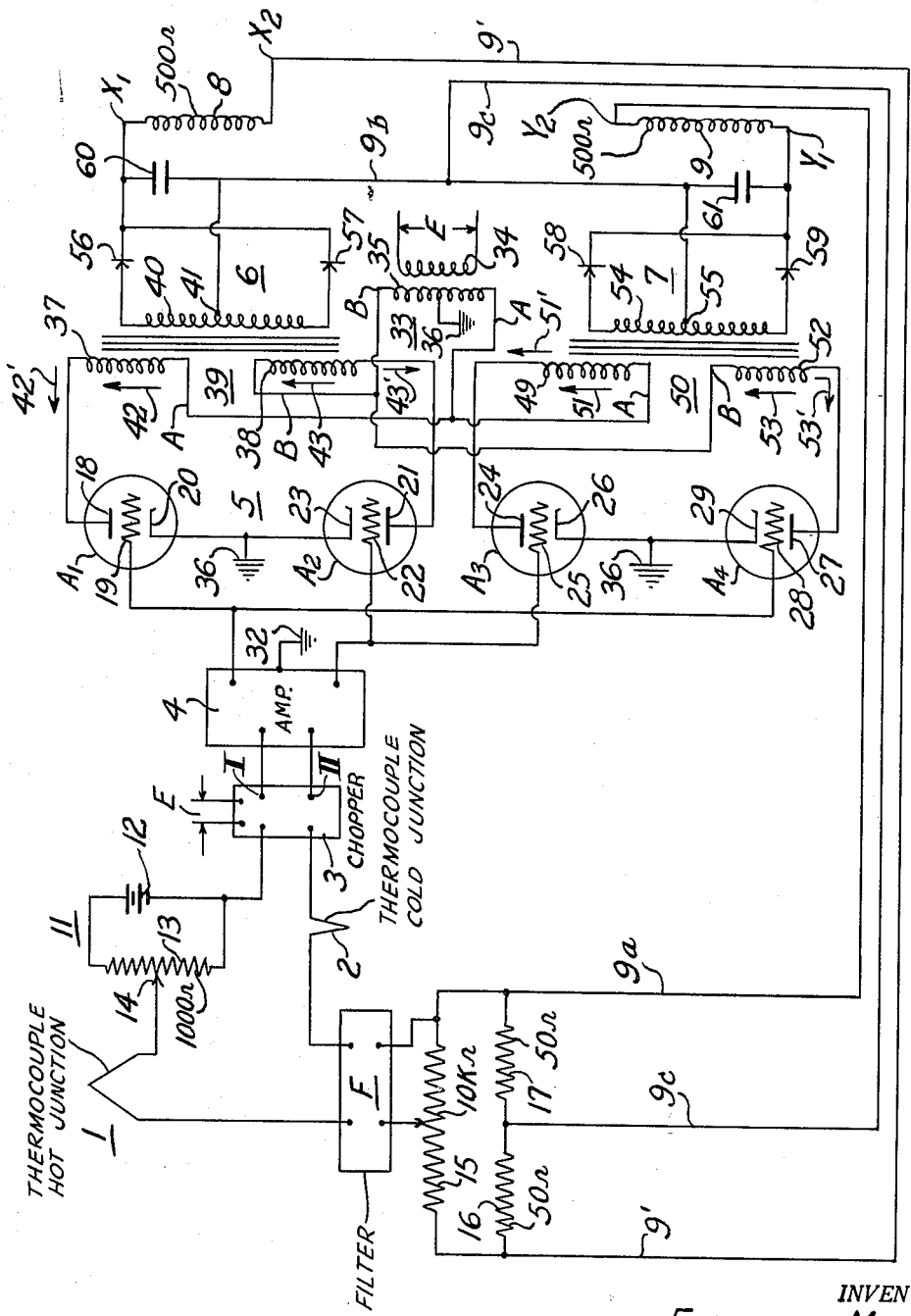
Figure 1 is a more or less diagrammatic view of a thermocouple temperature measuring system embodying a form of the invention, which includes a thermocouple voltage chopper, an amplifier, demodulator and rectifier, the rectifier converting the demodulated output into a direct current output.
Figure 2:
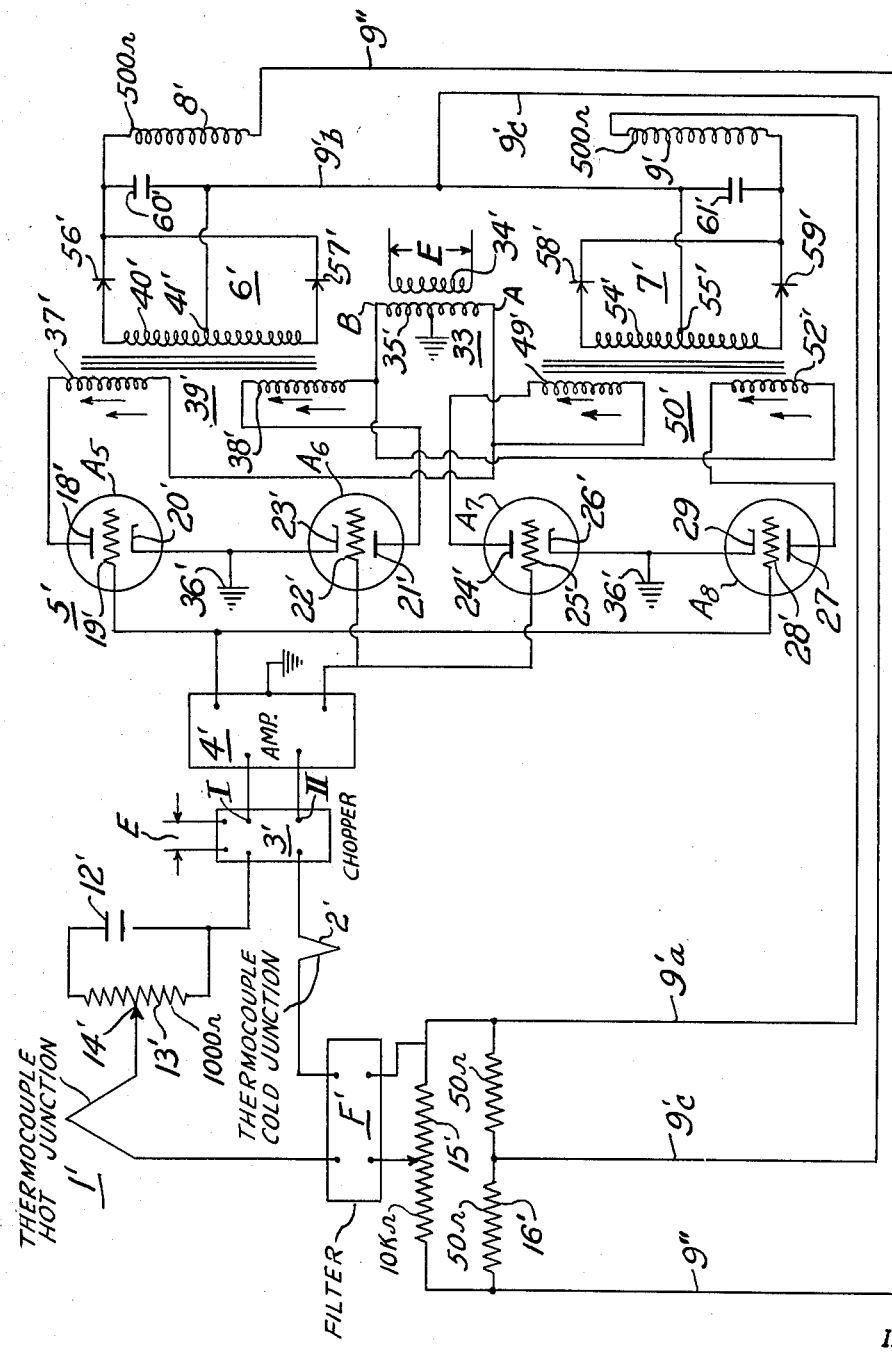
Fig. 2 is a view similar to Fig. 1 of a modified form of circuit arranged and constructed in accordance with an embodiment of the invention.

Fig. 5 is a more or less diagrammatic view of a transducer or converter which converts the electric output of the systems shown in Figs. 1 and 2 to another form of power such for example as a pneumatic pressure that varies by and in accordance with the output of the circuits of either Fig. 1 or 2. In Figs. 1 and 2 values of resistance and capacity are indicated by legends $\Omega$, mfd. and $k$ which signify ohms, microfarads and 1000 ohms respectively; and Fig. 6 is a more or less diagrammatic view of a bridge for automatically compensating the cold junction of the thermocouple, and which may be employed with either of the circuits shown in Figs. 1 and 2.

The system of Figure 1 comprises a thermocouple 1 having a cold junction 2, and a chopper 3 to which the thermocouple voltage is supplied. Junction 2 may be of the automatically-temperature-compensated type. The circuit includes an amplifier 4 that is supplied by the interrupted voltage of chopper 3. The output of the amplifier 4 is supplied to a demodulator 5. That output is rectified by a pair of rectifier systems 6 and 7. The rectified output of the systems 6 and 7 flow through coils 8 and 9 respectively of a transducer or converter 10 shown more or less in detail in Fig. 5.

In order that the system may be adjusted to operate at a particular set or null point, a potentiometer 11 is provided for the hot junction 1 of the thermocouple. The potentiometer comprises a battery or reference cell 12, a potentiometer resistor 13 connected across the battery and an adjustable contact member 14. By adjusting the potentiometer the voltage added to or subtracted from the thermocouple voltage can be adjusted or preset to the null or set point desired.

For example, suppose the system is to measure temperature and to regulate the temperature within a range of say 1000° F. to 1500° F., to a set point value of say 1250° F., the potentiometer 11 is adjusted to provide a null or set point of 1250°. In that case the thermocouple voltage and the potentiometer voltage will cause the output of rectifier system 6 to exceed that of rectifier system 7 until the null point is reached. At that point coils 8 and 9 balance each other and device 10 will be at the mid-scale or point of its output pressure range. As the temperature exceeds the null or set point value, the polarity of the thermocouple and potentiometer voltage input to chopper 3 reverses, causing the output of rectifier system 7 to exceed that of system 6. In that event coil 9 is energized more than coil 8 whereby device 10 is actuated in a direction to bring the temperature condition back to the null point. Means, as will be shown infra, are provided by which the null point of the temperature range may be shifted to some value other than the mid-point of the range. Thus in the example given, the null point may be at 1100° F. in which case there would be a temperature range of 400° F. above and a 100° F. range below the null point.

One terminal $x_1$ of coil 8 is connected to the positive terminal of rectifier system 6 and the other terminal $x_2$ is connected by a conductor 9' to a series-parallel resistance circuit composed of a calibrated resistor 15 and series-connected calibrated resistors 16 and 17. The resistors 15, 16 and 17 as shown, form a parallel circuit. Conductor 9' is connected to the junction of resistors 15 and 16. Terminal $y_1$ of coil 9 is connected to the positive terminal of rectifier system 7 and terminal $y_2$ is connected by a conductor 9a to the junction of resistors 15 and 17. The rectifier systems 6 and 7 are interconnected by a conductor 9b and that conductor is connected by a conductor 9c to the junction of resistors 16 and 17.

The current flowing in coil 8 flows also through resistor 16, and the current flowing in coil 9 flows also through resistor 17. The difference between the voltages across resistors 16 and 17 is impressed on resistor 15 and that voltage is in turn fed through a filter F in series with the thermocouple 1. If the values of resistance of resistors 16 and 17 are properly selected, the temperature ranges above and below the null point may be adjusted. For example, if the resistance of resistor 17 is twice that of resistor 16, the range above the null point may be twice the range below the null point. Other relative values of resistance in resistors 16 and 17 will give other ranges above and below the null point.

As will be shown infra, if the difference in the voltages as applied to coils 8 and 9 is higher than it should be for a given input voltage of thermocouple 1 to chopper 3, the feed back through the resistance circuit 15, 16 and 17 and filter F to the thermocouple circuit operates to decrease the effective input voltage of the thermocouple circuit, thereby reducing the output of the demodulator 5 as measured across coils 8 and 9. If the above voltage difference as measured across coils 8 and 9 is less than what it should be for a given thermocouple voltage input, the feed back voltage adds to the thermocouple voltage whereby the voltage output of the demodulator is raised to the value required by the thermocouple voltage.

The demodulating circuit 5 comprises two pairs of tubes A1 and A2, and A3 and A4. Tubes A1—A2 and A3—A4 may be 6SN7 tubes, respectively. As shown, tube A1 includes a plate 18, a grid 19 and an indirectly heated cathode 20, and tube A2 includes a plate 21, a grid 22 and an indirectly heated cathode 23.

Tube A3 includes a plate 24, a grid 25 and an indirectly heated cathode 26, and tube A4 includes a plate 27, a grid 28 and an indirectly heated cathode 29.

As shown, grids 19 and 28 of tubes A1 and A4 are connected together to output terminal 30 of the amplifier 4 while grids 22 and 25 of tubes A2 and A3 are connected together to output terminal 31 of amplifier 4. The amplifier 4 has a grounded center tap 32. Therefore, the voltages between terminal 30 and ground and terminal 31 and ground will always be of opposite polarity.

The plate voltage for tubes A1 and A2 and A3 and A4 are supplied by a transformer 33 having a primary or input winding 34 and a center tap secondary or output winding 35, the center tap of the latter being connected to ground at 36. The cathodes of tubes A1, A2, A3 and A4 are also connected to ground at 36. The terminals of winding 35 are designated A and B to show the phase relation of the voltages supplied to the transformer windings which are connected in series with the plates of tubes A1 and A2 and A3 and A4. Terminal A of winding 35 is connected to transformer winding 37 through which current and voltage are supplied to plate 18 of tube A1. Terminal B of winding 35 is connected to a transformer winding 38 through which voltage and current are supplied to plate 21 of tube A2. By so connecting plates 18 and 21 to the power supply, the voltages on plates 18 and 21 are 180° out of phase with respect to each other.

Windings 37 and 38 constitute the primary or input windings of a transformer 39 having an output winding 40 provided with a center tap 41. The windings 37 and 38 are wound in the direction indicated by arrows 42 and 43, and being connected as shown in Fig. 1, the currents supplied by winding 35 to windings 37 and 38 flow in the direction indicated by arrows 42' and 43' respectively. In other words, the current in the respective windings 37 and 38 are opposite, thereby causing the frequency of the output of transformer 39 to be equal to the frequency of the supply voltage E to the input winding 34.

Terminal A of transformer winding 35 supplies voltage and current to plate 24 of tube A3, through a transformer winding 49 of a transformer 50 which is wound in the direction of arrow 51. The current to plate 24 flows in the direction of arrow 51'. Terminal B of transformer winding 35 supplies plate 27 of tube A4 through a transformer winding 52 which is wound in the direction of arrow 53. The current flow in winding 52 is in the direction of arrow 53' being opposite to the flow in winding 49, which results in the frequency of the output of transformer 50 to be equal to the frequency of the supply voltage E for transformer winding 34. Transformer 50 includes an output winding 54, having a center-tap 55, by which the rectifier system 7 is supplied.

The outputs of transformers 39 and 50 are rectified by means of full-wave rectifiers 56 and 57 and 58 and 59 of systems 6 and 7 respectively. In the rectifier system 6, a condenser 60 is connected between the output terminal of rectifier 56 and the center tap 41 of winding 40.

In the rectifier system 7, a condenser 61 is connected across the output terminal of rectifier 59 and the center tap 55 of winding 54. Center taps 41 and 55 are interconnected by conductor 9b.

Fig. 2 illustrates a modified form of the system. In so far as various components of Fig. 2 are identical to those of Fig. 1 such components will be identified by the same reference characters with primes affixed.

In Fig. 2 the tubes of demodulator 5' are identified as A5 and A6, and A7 and A8 respectively.

The system shown in Fig. 2 differs from that shown in Fig. 1 in the manner in which the transformer windings 37' and 38' and 49' and 52' are connected to terminals A' and B' of transformer winding 35'. Terminal A' of output winding 35' of transformer 33' is connected to transformer windings 37' and 49' in the same way as in Fig. 1, while the connection of terminal B of winding 35' to windings 38' and 52' is that current flows in the same direction as that in which the windings are wound. Therefore, the cores of each of transformers 39' and 50' will receive two magnetizations in the same direction per cycle of input voltage to winding 34' with the result that the frequency of the input to systems 6' and 7' will be twice the frequency of the input to the systems 6 and 7 of Fig. 1. The frequency of the outputs of transformers 39' and 50' will therefore be twice the frequency of the input voltage to winding 34' of transformer 33'. The output of transformers 39' and 50' are rectified by full wave rectifiers 6' and 7' and supplied to the coils 8' and 9'. The current in coils 8' and 9' flow in the resistance circuit 15', 16' and 17' in the same manner as in Fig. 1. The voltage difference across resistors 16' and 17' is filtered by a filter F' and supplied to the thermocouple 1' as in Fig. 1.

Figure 3:
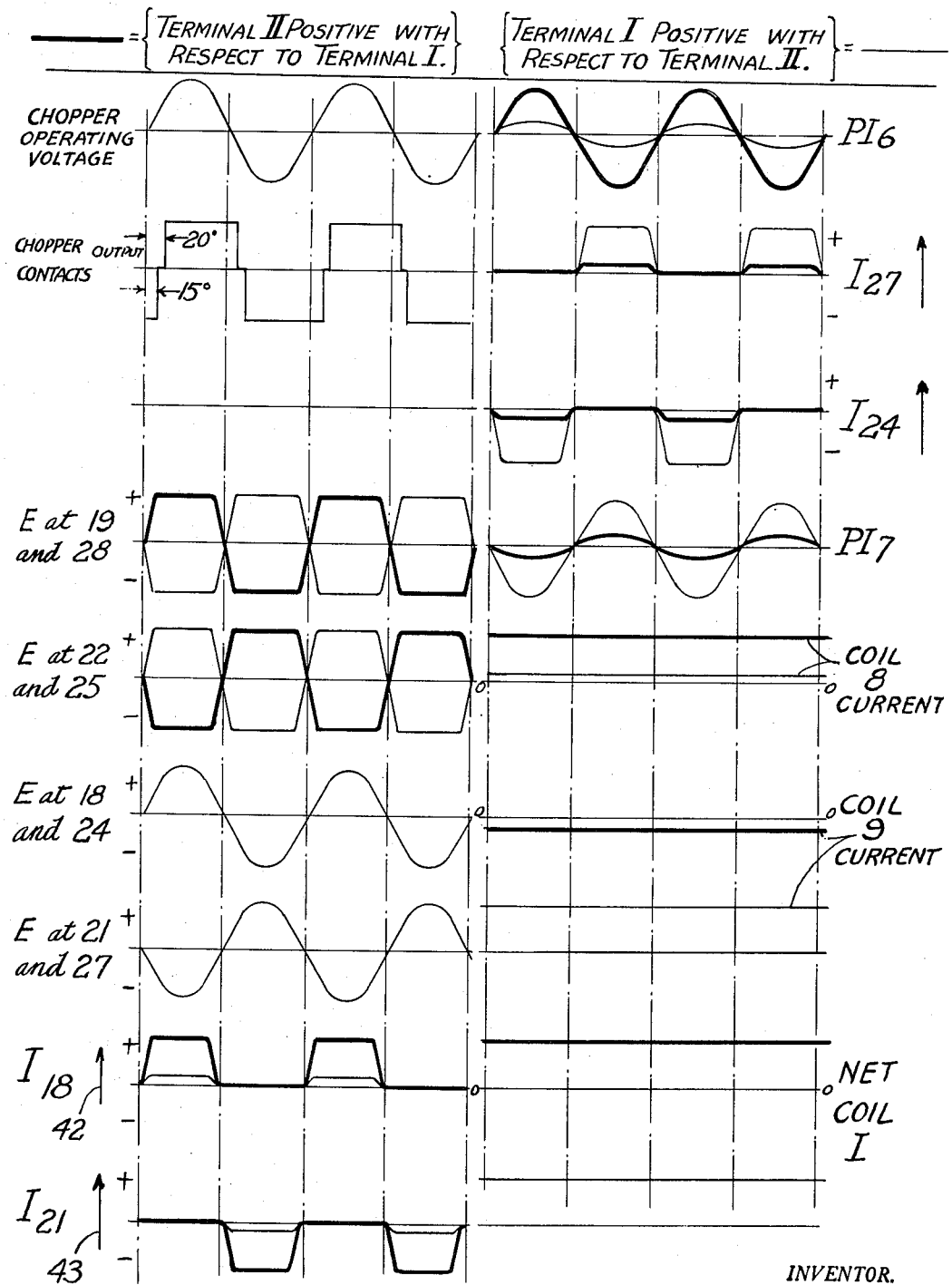
Fig. 3 is a graph illustrating the wave form of the output of the demodulator of Fig. 1.
Figure 4:
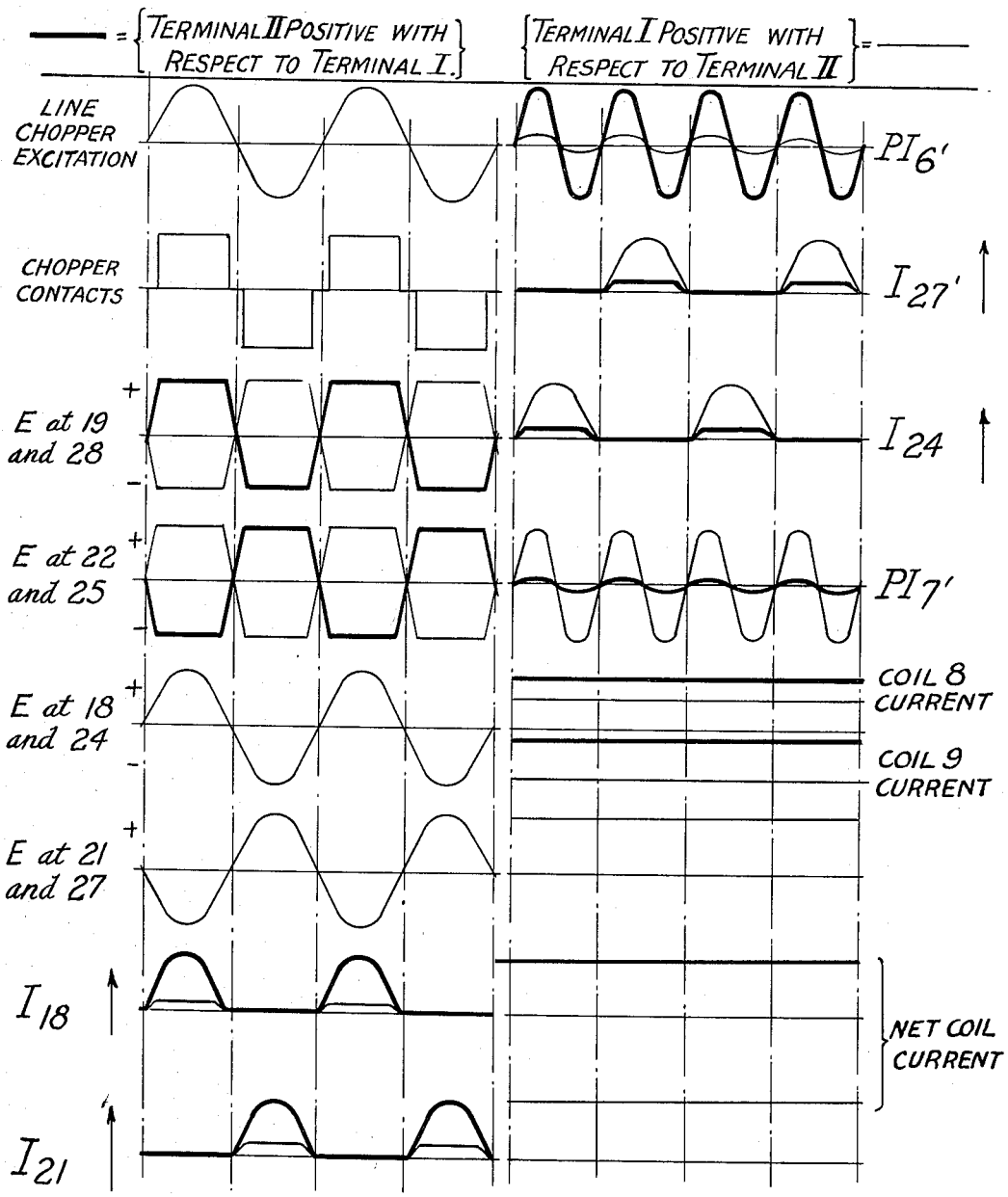
Fig. 4 is a graph showing the wave form of the demodulated output of the circuit shown in Fig. 2.

The outputs of demodulator 5 and 5' of Figs. 1 and 2 are illustrated by the graphs in Figs. 3 and 4. The legends of Fig. 4 are the same as those applied to Fig. 3 with primes affixed. The chief difference between Figs. 3 and 4 is that the frequency of the output of demodulator 5' is twice the frequency of the output of demodulator 5— compare curves P16' and P17' with curves P16 and P17.

The curves in Fig. 3 illustrate the operation of the circuit of Fig. 1. The curve "chopper operating voltage" represents the operating voltage supplied to chopper 3 and indicates that the frequency of its operating voltage is the same as the frequency of the voltage supplied to transformer 33 and that the chopper is synchronized with the supply voltage to transformer 33.

The curve designated "chopper contacts output" represents the alternating current supplied by the chopper to the amplifier 4. The curves designated "E at 19 and 28" represents the voltages supplied to grids 19 and 28. The heavy line curve indicates that terminal II of chopper 3 is positive with respect to terminal I thereof. The light line curve represents the condition when terminal I is positive with respect to terminal II.

The curves indicated by the legend "E at 22 and 25" represent the voltages supplied to grids 22 and 25. The heavy line curve represents the condition when terminal II of chopper 3 is positive with respect to terminal I and the light line curve represents the condition when terminal I is positive with respect to terminal II. The curves designated by the legends "E at 18 and 24" and "E at 21 and 27" represent the voltages on plates 18 and 24 and 21 and 27 respectively. As these curves show, the voltages applied to plates of the above designated pairs are 180° out of phase.

The curve designated I18 represents by the heavy line curve the output current or the current passed by plate 18 when terminal II is positive with respect to terminal I. The light line indicates that plate 18 passes a small amount of current when grid 19 is negative. The arrow 42 represents the direction in which transformer winding 37 is wound, that winding being traversed by the current I18. The curve designated "I21" shows in heavy line the current passed by plate 21 when the current passed by plate 18 is substantially zero. The light line indicates that a small amount of current is passed by plate 21 when its grid 22 is negative. The arrow 43 indicates the direction in which winding 38 is wound.

The curve designated "PI6" represents the current supplied to the rectifier system 6. The heavy line curve represents the total current passed when terminal II is positive with respect to terminal I and the light line shows the total output supplied to rectifier system 6 when the terminal I is positive with respect to terminal II.

The curves designated "I27," "I24" and "PI7" have reference to the currents passed by plates 24 and 27 of tubes A3 and A4 and the total current supplied by transformer 52 to rectifier system 7. By the heavy lines of graphs I27 and I24 the current passed by plates 27 and 24 is shown for the condition when terminal II is positive with respect to terminal I; while the light lines show the plate currents for the condition when terminal I is positive with respect to terminal II.

The heavy line of graph PI7 indicates the relatively small total output of transformer 50 as supplied to rectifier system 7 when transformer 39 is supplying the current PI6 indicated by heavy lines. The light line curve of graph PI7 indicates the total current supplied to the rectifier system 7 when the current supplied by transformer 39 to rectifier system 6 is relatively small as indicated by the light line of graph PI6.

The heavy straight line curves of graphs "coil 8 current" and "coil 9 current" show the current supplied to coils 8 and 9 when terminal II is positive with respect to terminal I and the line curves indicate the current in these coils when terminal I is positive with respect to terminal II.

In the graph designated "Net coil current" the heavy line represents the current supplied to coil 8 when terminal II is positive with respect to terminal I and the light line the net current in coil 9 when the terminal I is positive with reference to terminal II.

Thus the curves of Figs. 3 and 4 show the relative values of current supplied to coils 8 and 9, depending upon whether the terminal II is plus with respect to terminal I or vice versa.

The curves of Fig. 4 indicate the performance of the circuit illustrated in Fig. 2. The heavy lines in the various groups of curves represent the condition when terminal II is plus or positive with respect to terminal I; the light lines show the conditions when the polarity of these terminals is reversed. The chief difference between the curves of Fig. 3 and Fig. 4 lies in the fact that the frequency of the output to rectifiers systems 6' and 7' of Fig. 2 is double the frequency supplied to rectifiers systems 6 and 7 of Fig. 1.

By inspection of Figs. 3 and 4 it can be seen that the currents in coils 8 and 9 or 8' and 9' may be equal under certain conditions or the one current may be greater than the other. Therefore the net force produced by coils 8 and 9 or coils 8' and 9' will be proportional to the difference in the currents in the two coils.

The current in coils 8 and 9 or 8' and 9' will be equal at the null point but will be relatively greater in one than in the other when the voltage of the thermocouple is above or below the null point. As Figs. 1 and 2 indicate, the direct current voltage supplied to the chopper 3 is interrupted to thereby supply the amplifier 4 with alternating input. The amplifier 4 is arranged for balanced output and demodulator 5 is phase discriminating. That being so, coil 8 will be energized more than coil 9 when the temperature is above the null or set point and the current in coil 9 will be relatively greater when the temperature is below the set point.

In Fig. 5 the transducer 10 is illustrated more or less in detail. The current supplied to coils 8 and 9 thereof is converted to another form of energy such as a pneumatic pressure, for example. The device 10 comprises the coils 8 and 9 which are secured to a beam 70 mounted on a knife edge 71 or other anti-friciton bearing. The device includes also an output device such as an escapement valve 72 which is supplied with compressed air or other fluid by a pipe 73 in which the pressure is maintained at a substantially constant value. The valve 72 has a valve element 74 that is connected to the beam 70. The output of the valve 72 is supplied to a balancing device 75 which may include a bellows 76 provided with a thrust member 77 that exerts a force on beam 70 in opposition to the forces exerted on the beam by coils 8 and 9. The output of valve 72 may also be conducted by a pipe 78 to a recording or indicating instrument 79. The instrument 79 may be calibrated in terms of temperature as measured by the thermocouple 1. The output in pipe 78 may also be communicated to regulating apparatus illustrated schematically at 80. The instrument 79 as well as the regulating apparatus 80 may be located near to or at a point remote from that at which the thermocouple and the electronic apparatus controlled thereby are located.

The coils 8 and 9 are disposed in the air gap of a strong permanent magnet 81 of the pot type. Magnet 81 includes an annular cup or pot 82 having a core 83 extending upwardly from the center thereof into the coils 8 and 9 as shown. The cup 82 may be made of a high quality magnetic material and the center core 83 may be made of a material having strong permanent magnetic qualities such as that possessed by a commercial alloy known as "Alnico." The current in coils 8 and 9 flows in opposite directions. Since the magnet 81 is a permanent magnet and has a substantially constant field, the pull and the direction of that pull, of the coils 8 and 9 will be a function of the algebraic sum of the currents flowing in coils 8 and 9. The direction of the pull will be either into or out of the pot depending on which coil carries the most current.

If the coils 8 and 9 are connected to the rectifier systems 6 and 7 in such fashion that the current flow in coil 8 causes the beam 70 to turn clockwise about fulcrum 71 and coil 9 is so connected that current flow therein tends to cause beam 70 to turn counterclockwise, then when the current in coils 8 and 9 are equal the forces exerted by them on beam 70 will be equal and opposite (one coil being repelled and the other attracted by the magnet).

If the algebraic sum of the forces developed by coils 8 and 9 in the field of magnet 81 is such as to turn the beam 70 counterclockwise, valve element 74 will be moved upwardly in a direction to restrict the outlet port 85 of valve 72 and to uncover the inlet port 86. Under such circumstances the pressure delivered at the outlet of the valve and to the balancing device 75 will be increasing. The increased pressure delivered to the device 75 will cause bellows 76 to exert a force on beam 70 sufficient to balance the total force exerted by coils 8 and 9 on the beam. If the force developed by coils 8 and 9 decreases then the beam 70 will be turned counterclockwise until the valve element 74 has restricted the inlet port 86 sufficiently to reduce the pressure acting on bellows 76 to a value at whch the force of the bellows on the beam balances the coil force on the beam.

The valve 72 may be of a type which is capable of delivering a pressure to line 78 and to device 75 that varies in range from zero pounds gauge to some maximum value, for example 60, 90 or 100 pounds gauge. For every position of the value element 74 with respect to the inlet and exhaust ports 86 and 85 there will be a corresponding and definite pressure in line 78 and in the balancing device 75. The beam 70 may be provided with a counterweight W which may be moved along the beam to such a point that the weight of the parts acting on the beam are counterbalanced and neutralized so that only the forces exerted by the coils and the bellows 76 will be effective in converting the electric input to coils 8 and 9 to a pneumatic pressure in line 78.

In order that the output pressure of device 10 will be at mid-scale when the thermocouple voltage is at the null point, a spring 87 is connected to the beam 70. The tension in that spring is so adjusted that when the currents in coils 8 and 9 are equal the beam will be in the position where the output pressure from valve 72 will be at the mid-point of its sending range. For example, if the sending range of the valve is zero to 60, or zero to 90 or zero to 100 pounds per square inch gauge the mid-scale position of the beam will be either 30, 45 or 50 pounds per square inch gauge. Therefore, if the temperature rises above the null point the pressures will increase towards the maximum of the range, and if the temperature decreases below the null point the pressures will decrease towards the zero gauge value.

The cold junction 2 of the thermocouple as shown in Figs. 1 and 2 may be arranged to provide automatic compensation for temperature change of the cold junction so as to in effect produce the same result that a constant temperature cold junction would produce. As shown in Fig. 6, the plus side of the hot junction 1 of the couple is connected directly to chopper 3 and the negative side is connected to filter F. The plus side of the cold junction 2 is connected to one side of a Wheatstone bridge 92, the opposite side of the bridge being connected to chopper 3.

Bridge 92 is composed of resistors whose temperature coefficients of resistance balance out voltage changes at the cold junction 2 resulting from temperature changes. The potentiometer 11 or 11' of Figs. 1 and 2, are incorporated in bridge 92, as will be eplained infra.

Bridge 92 comprises four branches in one of which is a resistor R1, in another are series connected resistors R6 and R7, in a third branch is a resistor R5 and in the fourth are series connected resistors R2 and R3. The positive terminal of cold junction 2 is connected to the junction of resistors R5 and R6. The opposite point of the bridge, i. e., the junction point of resistors R1 and R2, is connected to chopper 3.

As above stated, potentiometer 11 or 11', is embodied in bridge 92, and comprises a battery 93, an adjustable resistor 94 and a slide wire contact member 95, these being in series and connected to the bridge at the junction points of resistors R1 and R7, and R3 and R5, respectively.

The resistors of the bridge 92 may have the ohmic values indicated, and be composed of the materials suggested by legends. The ohmic value of resistor R6 is one which will have the same voltage across it as the voltage of the thermocouple at the set point.

Having thus described the invention, it will be apparent to those of ordinary skill in the art to which it pertains, that various modifications and changes may be made in the illustrated embodiments without departing from either the spirit or the scope of the invention.

Therefore, what is claimed as new and desired to be secured by Letters Patent is:

1. An electronic temperature responsive system comprising a thermocouple, a chopper connected to the thermocouple for interrupting the thermocouple E. M. F., an amplifier connected to the chopper for amplifying the interrupted voltage thereof, a grid controlled power output tube system connected to the amplifier, rectifiers for rectifying the output of the power output unit, calibrated resistors in circuit with the rectifiers, means for feeding back to the thermocouple the voltage difference across said calibrated resistors to maintain a predetermined relationship between the input of the thermocouple and the output of the power units and means responsive to the voltage across said calibrated resistors for developing an output that is proportional to the difference between them.

2. Apparatus according to claim 1 in which the thermocouple is provided with a constant source of direct current E. M. F. across which is a potentiometer, the thermocouple being connected to the potentiometer, thereby to adjust the voltage in series with the thermocouple as delivered to the chopper.

3. An electronic temperature responsive apparatus comprising a thermocouple for developing a voltage by and in accordance with changes in temperature, a chopper connected to the thermocouple voltage for interrupting that voltage at a predetermined frequency rate, an amplifier controlled by the chopper, said amplifier having a neutral and two opposite output terminals, a power unit including two pairs of grid controlled tubes connected to the amplifier, one tube of each pair being controlled by one terminal of the amplifier, and the grids of the other tubes of said pairs being controlled by the other terminal of said amplifier, rectifiers connected to the plate circuit of said tubes, calibrated resistors in circuit with each of said rectifiers, and a circuit for feeding back to the thermocouple in series therewith the difference between the voltage across said calibrated resistors, whereby the output of said power unit is caused to vary in accordance with the difference between the power output and the input voltage of the thermocouple.

4. Apparatus according to claim 3 in which the plate circuits of the tubes of one pair are connected to the windings of a transformer in such relation to each other that the currents in said tube circuits flow in the same traction through the windings and that the plate circuits of the tubes of the other pair are connected to transformer windings in opposed relation to the windings connected to the plate circuits of the other pair.

5. Apparatus according to claim 3 in which the transformer windings in circuit with the plates of one pair of tubes are connected to carry current in opposed relation to each other and the transformer windings connected to the plate circuits of the other pair are also connected in opposed relation to each other but 180 degrees out of phase with respect to the windings of the first-mentioned pair.

No references cited.